United States Patent
Jeong et al.

(10) Patent No.: US 10,956,144 B2
(45) Date of Patent: Mar. 23, 2021

(54) APPARATUS FOR PROVIDING UPDATE OF VEHICLE AND COMPUTER-READABLE STORAGE MEDIUM

(71) Applicants: HYUNDAI MOTOR COMPANY, Seoul (KR); KIA MOTORS CORPORATION, Seoul (KR)

(72) Inventors: Myeong Gyu Jeong, Seoul (KR); Dong Jin Shin, Suwon-si (KR); Dong Youl Lee, Seoul (KR); Young Su Kim, Seongnam-si (KR); Heok Sang Jeong, Suncheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/208,116

(22) Filed: Dec. 3, 2018

(65) Prior Publication Data

US 2020/0073654 A1 Mar. 5, 2020

(30) Foreign Application Priority Data

Sep. 5, 2018 (KR) .................... 10-2018-0106014

(51) Int. Cl.
*G06F 8/65* (2018.01)
*G06F 8/61* (2018.01)
(Continued)

(52) U.S. Cl.
CPC ............... *G06F 8/65* (2013.01); *G06F 8/64* (2013.01); *G06F 8/71* (2013.01); *H04W 8/245* (2013.01); *H04L 67/12* (2013.01)

(58) Field of Classification Search
CPC ..... G06F 8/60; G06F 8/65; G06F 8/654; G06F 8/658; G06F 8/71; G06F 11/1433
See application file for complete search history.

(56) References Cited

U.S. PATENT DOCUMENTS 8,458,689 B2   6/2013   Barman et al.
9,836,300 B2   12/2017   Moeller et al.
(Continued)

FOREIGN PATENT DOCUMENTS

DE   10 2015 216 265 A1   3/2017
EP         3 273 350 A1   1/2018
WO         2018/094180 A1   5/2018

OTHER PUBLICATIONS

Extended European Search Report issued in European Patent Application No. 18210519.7 dated Jun. 14, 2019.

*Primary Examiner* — Duy Khuong T Nguyen
(74) *Attorney, Agent, or Firm* — Morgan, Lewis & Bockius LLP

(57) ABSTRACT

An update providing apparatus of a vehicle includes a communication circuit communicating with a server, a memory, a first controller, a second controller, and a control circuit electrically connected to the communication circuit, the memory, the first controller, and the second controller. The control circuit is configured to receive data for an update of the first controller or the second controller, from the server by using the communication circuit, to store the data for the update in the memory and transmit the data for the update to the first controller, when the data for the update is associated with the first controller, and to transmit the data for the update to the second controller without storing the data for the update, when the data for the update is associated with the second controller.

9 Claims, 8 Drawing Sheets

(51) Int. Cl.
*G06F 8/71* (2018.01)
*H04W 8/24* (2009.01)
*H04L 29/08* (2006.01)

(56) References Cited

U.S. PATENT DOCUMENTS

| | | | |
|---|---|---|---|
| 10,452,375 B1* | 10/2019 | Nightingale | G06F 21/53 |
| 2005/0256614 A1 | 11/2005 | Habermas | |
| 2008/0320110 A1* | 12/2008 | Pathak | G06F 11/1433 |
| | | | 709/220 |
| 2014/0068590 A1* | 3/2014 | Natsume | G06F 8/65 |
| | | | 717/170 |
| 2016/0196131 A1* | 7/2016 | Searle | H04L 29/06 |
| | | | 717/173 |
| 2016/0202966 A1* | 7/2016 | Vangelov | H04L 67/12 |
| | | | 717/172 |
| 2017/0024201 A1 | 1/2017 | Diedrich et al. | |
| 2017/0123784 A1* | 5/2017 | Zymeri | H04L 41/082 |
| 2017/0139778 A1* | 5/2017 | Kito | G06F 8/66 |
| 2017/0212746 A1* | 7/2017 | Quin | G06F 8/65 |
| 2018/0018160 A1 | 1/2018 | Teraoka et al. | |
| 2018/0143818 A1 | 5/2018 | Hirshberg et al. | |
| 2019/0057214 A1* | 2/2019 | Xia | G06F 21/44 |
| 2019/0310843 A1* | 10/2019 | Fox | G06F 9/44521 |
| 2020/0050378 A1* | 2/2020 | Sakurai | G06F 3/0679 |

* cited by examiner

APPARATUS FOR PROVIDING UPDATE OF VEHICLE AND COMPUTER-READABLE STORAGE MEDIUM

CROSS-REFERENCE TO RELATED APPLICATION

This application is based on and claims the benefit of priority to Korean Patent Application No. 10-2018-0106014, filed on Sep. 5, 2018 in the Korean Intellectual Property Office, the entire contents of which are incorporated herein by reference.

TECHNICAL FIELD

The present disclosure relates to a technology for updating the software of a controller mounted in a vehicle.

BACKGROUND

With the development of the automobile industry, a system for providing various services using wireless communication technology is continuously being developed to provide convenience to a driver. For example, a vehicle may update the software of a controller mounted in a vehicle, over wireless communication. For the purpose of supporting the update of the controller, a means for restoring the software to a previous version may be required for safety when the update fails. The software of the previous version needs to be stored in a memory for the purpose of restoring to the previous version.

For the purpose of supporting a roll-back, it may be necessary to secure the capacity of a memory mounted in a vehicle to store software of a previous version in the memory. The manufacturing cost of the vehicle may significantly increase to increase the capacity of the memory. Accordingly, the design for minimizing the memory capacity in mass production is required. The software capacity (e.g., about 12000 MByte) of a controller that controls a multimedia device may be greater than the software capacity (e.g., about 200 MByte) of the controller that controls the behavior of the vehicle. That is, a memory having an excessively large capacity may be required to roll back the multimedia device having the low correlation with the safety of the vehicle.

SUMMARY

The present disclosure has been made to solve the above-mentioned problems occurring in the prior art while advantages achieved by the prior art are maintained intact.

An aspect of the present disclosure provides a roll-back method suitable for the type of a controller to minimize the capacity of a memory mounted in a vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an update providing apparatus of a vehicle may include a communication circuit communicating with a server, a memory, a first controller, a second controller, and a control circuit electrically connected to the communication circuit, the memory, the first controller, and the second controller. The control circuit may be configured to receive data for an update of the first controller or the second controller, from the server by using the communication circuit, to store the data for the update in the memory and transmit the data for the update to the first controller, when the data for the update is associated with the first controller, and to transmit the data for the update to the second controller without storing the data for the update, when the data for the update is associated with the second controller.

According to an embodiment, the control circuit may be configured to roll back data of the first controller to a previous version by using a previous version of data stored in the memory, when the update of the first controller fails.

According to an embodiment, the control circuit may be configured to terminate the update of the second controller without roll-back, when the update of the second controller fails.

According to an embodiment, the apparatus may further include an output device. The control circuit may be configured to output a message for providing a notification of the failure by using the output device, when the update of the second controller fails.

According to an embodiment, the control circuit may be configured to determine whether the received data for the update is associated with the first controller or with the second controller.

According to an embodiment, the control circuit may be configured to determine whether the received data for the update is associated with the first controller or with the second controller, depending on determination by the server.

According to an embodiment, the first controller may be configured to control a behavior of the vehicle.

According to an embodiment, the second controller may include a controller other than the first controller, among controllers included in the vehicle.

According to an embodiment, the control circuit may be configured to obtain version information of data of a target controller of the update and to download the data for the update from the server, when there is a need for the update.

According to an embodiment, the control circuit may be configured to determine whether a previous version of data of the first controller is stored in the memory, when updating the first controller and to download the previous version of data from the server, when the previous version of data is not stored in the memory.

According to an embodiment, the control circuit may be configured to determine whether a previous version of data of a target controller of the update is stored in the memory, before the update, to download a previous version of data of the first controller from the server, when the previous version of data of the first controller is not stored in the memory, and to download data for outputting a message for providing a notification that the update fails, from the server, when a previous version of data of the second controller is not stored in the memory.

According to an embodiment, the control circuit may be configured to transmit the stored data for the update to the first controller after storing the data for the update in the memory, when the data for the update is associated with the first controller.

According to another aspect of the present disclosure, a non-transitory computer-readable storage medium may store instructions executed by at least one processor included in an apparatus. The instructions, when executed by the at least one processor, may include receiving data for an update of a first controller or a second controller from a server, storing the data for the update and transmit the data for the update to the first controller, when the data for the update is associated with the first controller, and transmitting the data for the update to the second controller without storing the data for the update, when the data for the update is associated with the second controller.

According to an embodiment, the instructions, when executed by the at least one processor, may include rolling back data of the first controller to a previous version by using a pre-stored previous version of data, when the update of the first controller fails.

According to an embodiment, the instructions, when executed by the at least one processor, may include terminating the update of the second controller without roll-back and outputting a message for providing a notification of the failure, when the update of the second controller fails.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
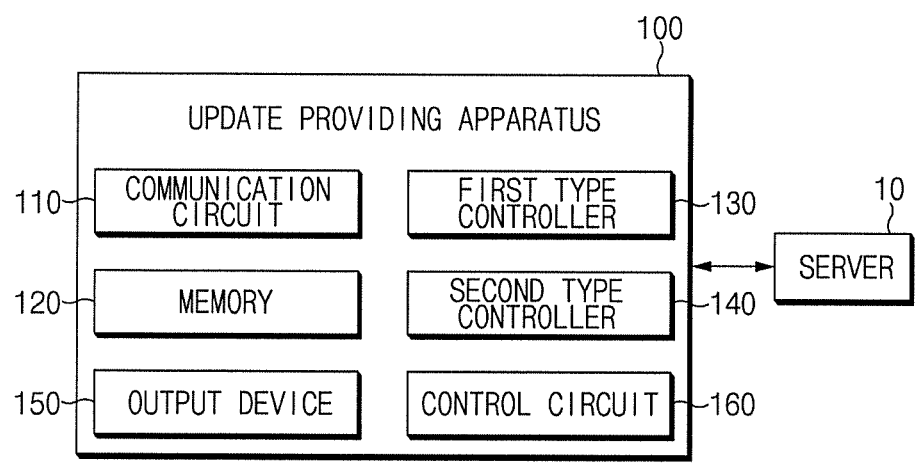
FIG. 1 is a block diagram illustrating a configuration of an update providing apparatus of a vehicle, according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 is a block diagram illustrating a configuration of an update providing apparatus of a vehicle, according to an embodiment of the present disclosure.

Referring to FIG. 1, an update providing apparatus 100 of a vehicle according to an embodiment may include a communication circuit 110, a memory 120, a first controller 130, a second controller 140, an output device 150, and a control circuit 160. The update providing apparatus 100 of FIG. 1 may be mounted in the vehicle.

The first controller 130 and the second controller 140 are different types of controllers in some embodiments.

The communication circuit 110 may be a hardware device implemented with various electronic circuits to transmit and receive signals via wireless connections. The communication circuit 110 may be configured to communicate with a server 10.

The communication circuit 110 may support wireless communication of various schemes and may receive data from the server 10.

The memory 120 may include a nonvolatile memory. The memory 120 may store various pieces of data associated with the update. In particular, the memory 120 may store data (e.g., a ROM image) for the update, for the purpose of performing a roll-back.

The first controller 130 may be an electric circuitry that executes instructions of software which thereby performs various functions associated with the safety of the vehicle. For example, the first controller 130 may be a controller configured to control the behavior of the vehicle.

The second controller 140 may be an electric circuitry that executes instructions of software which thereby performs various functions, which have the low correlation with the safety of the vehicle, such as multimedia, or the like. For example, the second controller 140 may include a controller other than the first controller 130, among controllers included in the vehicle.

The output device 150 may be configured to output a message to a driver. The output device 150 may include, for example, a display, a speaker, or the like.

The control circuit 160 may be electrically connected to the communication circuit 110, the memory 120, the first controller 130, the second controller 140, and the output device 150. The control circuit 160 may control the communication circuit 110, the memory 120, the first controller 130, the second controller 140, and the output device 150, and may perform various data processing and calculation. For example, the control circuit 160 may be an electronic control unit (ECU) or a sub-controller, which is mounted in the vehicle.

According to an embodiment, the control circuit 160 may receive data for the update of the first controller 130 or the second controller 140, from the server 10 by using the communication circuit 110. The control circuit 160 may obtain data version information of a target controller of the update. The control circuit 160 may determine that there is a need to update the target controller, when the version of the target controller is not the latest version. The control circuit 160 may download data for the update of the target controller, from the server 10, when there is a need for the update.

According to an embodiment, the control circuit 160 may determine whether the received data for the update is associated with the first controller 130 or whether the received data for the update is associated with the second controller 140. According to an embodiment, the control circuit 160 may determine whether the received data for the update is associated with the first controller 130 or whether the received data for the update is associated with the second controller 140, depending on the determination by the server 10 or the data transmitted from the server 10.

According to an embodiment, the control circuit 160 may store the data for the update in the memory 120 and may transmit the data for the update to the first controller 130, when the data for the update is associated with the first controller 130. After storing the data for the update in the memory 120, the control circuit 160 may transmit the stored data for the update to the first controller 130. The control circuit 160 may store the data associated with the first controller 130 in the memory 120 such that the stored data for the update is used for the roll-back when being updated later. The first controller 130 may store the received data and may perform the update by using the received data.

According to an embodiment, the control circuit 160 may roll back the data of the first controller 130 to the previous version by using the previous version data stored in the memory 120, when the update of the first controller 130 fails. The previous version data of the first controller 130 may be stored in the memory 120, when the previous version data is downloaded from the server 10. The control circuit 160 may roll back the data of the first controller 130 to the previous version by using the previous version data pre-stored in the memory 120 during the rollback. The control circuit 160 may roll back the first controller 130 securely by using the pre-stored previous version data.

According to an embodiment, the control circuit 160 may determine whether the previous version data of the first controller 130 is stored in the memory 120, when updating the first controller 130; the control circuit 160 may download the previous version data from the server 10, when the previous version data is not stored in the memory 120. For example, the control circuit 160 may download the previous version data from the server 10, in preparation for the rollback at the update, when the data of the first controller 130 is not stored in the memory 120 at all, or when an older version of the data is stored.

According to an embodiment, the control circuit 160 may transmit the data for the update to the second controller 140 without storing the data for the update, when the data for the update is associated with the second controller 140. In the case of the second controller 140, even though the update fails, the failure has little impact on safety. Accordingly, the data for the update may be transmitted to the second controller 140 without storage to reduce the manufacturing cost due to the high capacity of the memory 120. The second controller 140 may store the received data and may perform the update by using the received data.

According to an embodiment, the control circuit 160 may terminate the update of the second controller 140 without roll-back, when the update of the second controller 140 fails. In the case of the second controller 140, since the data for roll-back is not stored in the memory 120, the roll-back is impossible; the control circuit 160 may terminate the update without roll-back, because the safety is not nearly affected even though the roll-back is not performed. According to an embodiment, the control circuit 160 may output a message for providing a notification of the failure by using the output device 150 such that a driver recognizes that the update fails, when the update of the second controller 140 fails.

According to an embodiment, the control circuit 160 may determine whether the previous version data of the target controller of the update is stored in the memory 120, before the update; the control circuit 160 may download the previous version data of the first controller 130 from the server 10, when the previous version data of the first controller 130 is not stored; and the control circuit 160 may download data for outputting a message for providing a notification that the update fails, from the server 10, when the previous version data of the second controller 140 is not stored. The control circuit 160 may download data for outputting a failure message before starting the update, in preparation for update failure of the second controller 140. The control circuit 160 may output the failure message by using the downloaded data, when the update fails.

Figure 2:
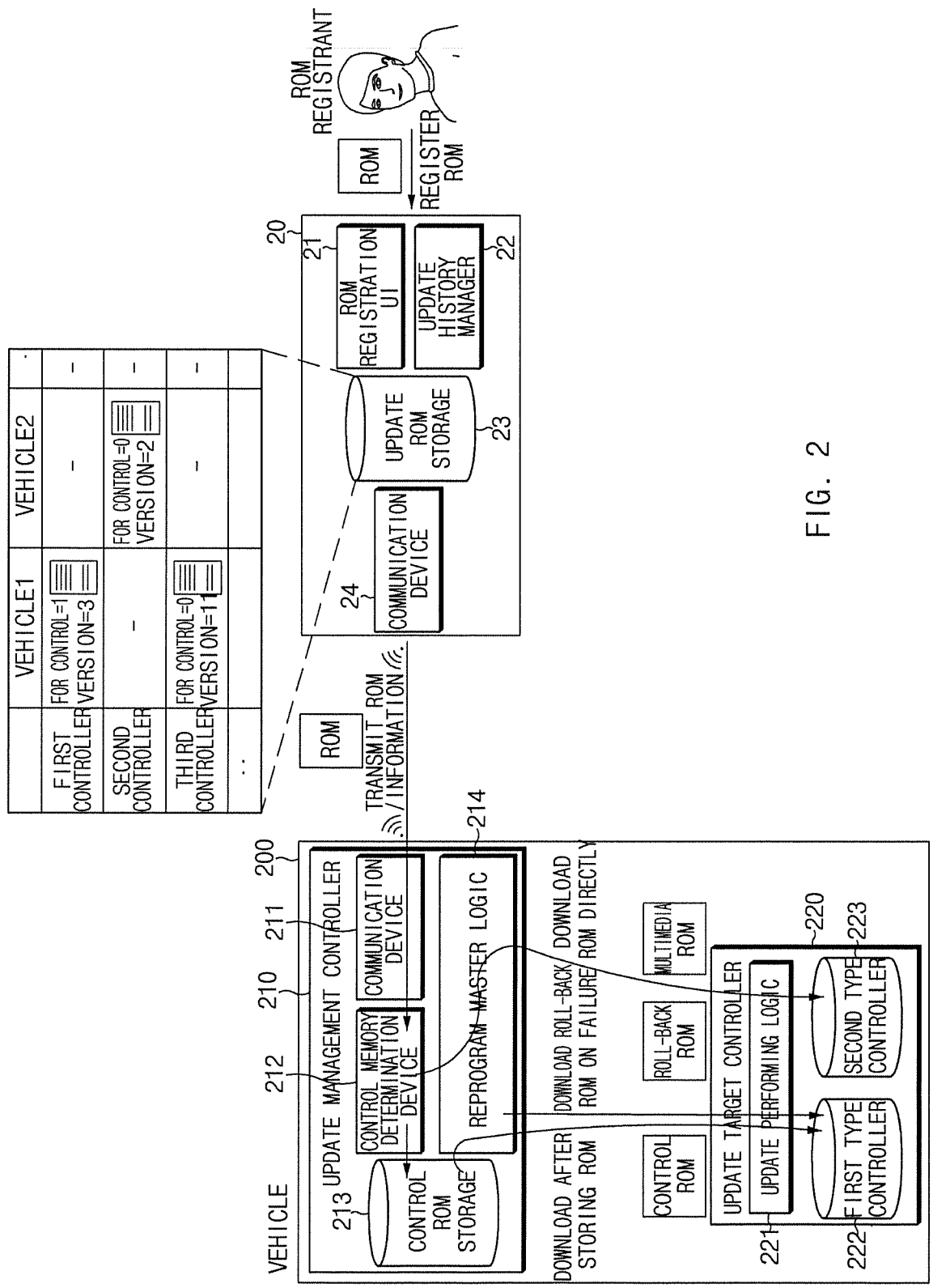
FIG. 2 is a view for describing an exemplary operation of an update providing apparatus of a vehicle, according to an embodiment of the present disclosure.

FIG. 2 is a view for describing an exemplary operation of an update providing apparatus of a vehicle, according to an embodiment of the present disclosure.

Referring to FIG. 2, a server 20 may include a ROM registration UI 21, an update history manager 22, update ROM storage 23, and a communication device 24. A ROM registrant may register a ROM image in the server 20 through the ROM registration UI 21, when the latest version of the controller software is launched. The update history manager 22 may manage update history information of a vehicle 200. The update ROM storage 23 may store the registered ROM image. The update ROM storage 23 may store information about the version of the ROM image and whether a controller corresponding to the ROM image is for controlling the behavior of the vehicle 200. Information about the type of the controller corresponding to the ROM image may be entered by the registrant and may be determined by the server 20. The communication device 24 may transmit the ROM image and information (e.g., controller information corresponding to the ROM image, type information of the controller corresponding to the ROM image, version information of the controller, and the like) about the ROM image to the vehicle 200, when there is a need to update the vehicle 200.

The vehicle 200 may include an update management controller 210 and an update target controller 220. The update management controller 210 may include a communication device 211, a control memory determination module 212, control ROM storage 213, and reprogram master logic 214. The communication device 211 may be a hardware device implemented with various electronic circuits to transmit and receive signals via wireless or landline connections, and may receive the ROM image and information about the ROM image from the server 20. The control memory determination module 212 may be implemented with a hardware processor to perform functions described hereinafter. The control memory determination module 212 may determine whether to store the ROM image received by the communication device 211 in the control ROM storage 213 or whether to transmit the ROM image to the update target controller 220 without storing the ROM image. The control memory determination module 212 may store the ROM image in the control ROM storage 213, when the ROM image corresponds to a controller for controlling a behavior (a first controller 222) of the vehicle 200. The reprogram master logic 214 may transmit the ROM image stored in the control ROM storage 213, to the first controller 222, which corresponds to the ROM image, in the update target controller 220. The control memory determination module 212 may transmit the ROM image to a second controller 223 through the reprogram master logic 214, when the ROM image does not correspond to the controller of the vehicle 200 for controlling a behavior (when the ROM image corresponds to the second controller 223).

The update target controller 220 may include update performing logic 221, the first controller 222, and the second controller 223. The first controller 222 may perform the update by using the received ROM image. The first controller 222 may receive the ROM image of the previous version stored in the control ROM storage 213 and may roll back the software by using the ROM image of the previous version, when the update fails. The second controller 223 may perform the update by using the received ROM image. The second controller 223 may terminate the update without roll-back, when the update fails.

Figure 3:
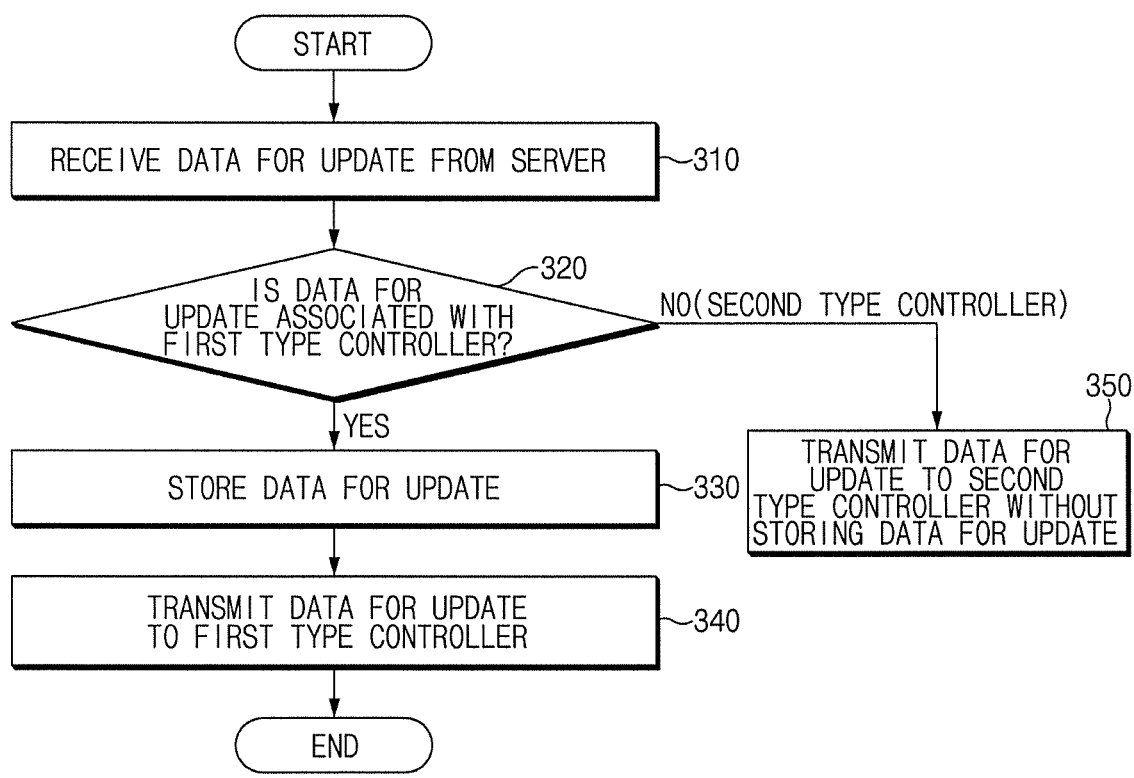
FIG. 3 is a flowchart for describing an update providing method of a vehicle, according to various embodiments of the present disclosure.

FIG. 3 is a flowchart for describing an update providing method of a vehicle, according to various embodiments of the present disclosure.

Hereinafter, it is assumed that the update providing apparatus 100 of FIG. 1 performs the process of FIG. 3. In addition, in a description of FIG. 3, it may be understood that an operation described as being performed by an apparatus is controlled by the control circuit 160 or a sub-controller of the update providing apparatus 100.

Referring to FIG. 3, in operation 310, an update providing apparatus may receive data for the update from a server. The update providing apparatus may receive data for the update from the server, when the software version of a controller is not the latest version.

In operation 320, the update providing apparatus may determine whether the data for the update is associated with a first controller. The update providing apparatus may determine whether the target controller of the update is the first controller.

In operation 330, the update providing apparatus may store the data for the update, when the target controller of the update is the first controller. The update providing apparatus may store the data for the update for rollback at the update to the next version.

In operation 340, the update providing apparatus may transmit the data for the update to the first controller. The update providing apparatus may perform the update by using the transmitted data.

In operation 350, the update providing apparatus may transmit the data for the update to a second controller without storing the data for the update, when the target controller of the update is the second controller. The update providing apparatus may perform the update without storing data associated with the second controller, which does not affect safety even though the update fails, to save the memory capacity.

Figure 4:
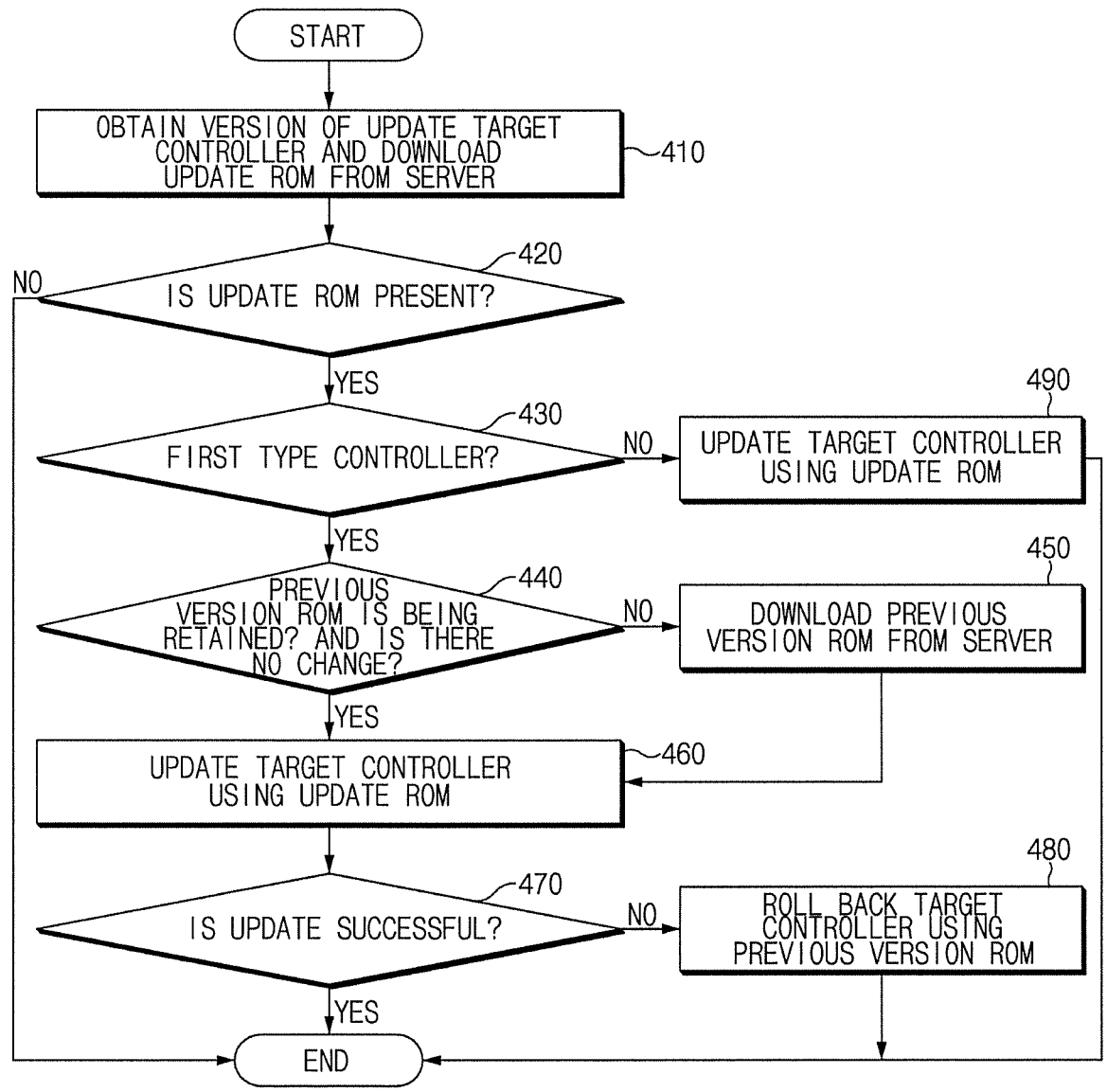
FIG. 4 is a flowchart for describing an update providing method of a vehicle, according to various embodiments of the present disclosure.

FIG. 4 is a flowchart for describing an update providing method of a vehicle, according to various embodiments of the present disclosure.

Hereinafter, it is assumed that the update providing apparatus 100 of FIG. 1 performs the process of FIG. 4. In addition, in a description of FIG. 4, it may be understood that an operation described as being performed by an apparatus is controlled by the control circuit 160 or a sub-controller of the update providing apparatus 100.

Referring to FIG. 4, in operation 410, an update providing apparatus may obtain the version of an update target controller and may download an update ROM image from a server.

In operation 420, the update providing apparatus may determine whether the update ROM image of the latest version is present. The server may compare the version of the update target controller with the version of the update ROM image; the server may transmit the update ROM image to the update providing apparatus, when the version of the update target controller is not the latest version. The update providing apparatus may terminate the update, when the update ROM image of the latest version is absent.

In operation 430, the update providing apparatus may determine whether the target controller is the first controller, when the update ROM image of the latest version is present. The update providing apparatus may verify whether the target controller is the first controller, based on information from the server; the update providing apparatus may directly verify whether the target controller is the first controller, based on the update ROM image from the server.

In operation 440, the update providing apparatus may determine whether there is the previous version ROM image and whether there is no change of the previous version ROM image, when the target controller is the first controller. The update providing apparatus may determine whether the previous version ROM image is stored in a memory and may determine whether the previous version ROM image is the immediately-preceding version of the update ROM image.

In operation 450, the update providing apparatus may download the previous version ROM image from the server, when the previous version ROM image is absent or when the previous version ROM image is changed. The update providing apparatus may secure the previous version ROM image for roll-back, when the update fails.

In operation 460, the update providing apparatus may update the target controller by using the update ROM image, when retaining the previous version ROM image and when there is no change of the previous version ROM image.

In operation 470, the update providing apparatus may determine whether the update is successful. The update providing apparatus may terminate the update, when the update is successful.

In operation 480, the update providing apparatus may roll back the target controller by using the previous version ROM image, when the update fails. The update providing apparatus may restore the target controller by using the pre-stored previous version ROM image, when the update of the first controller, which is capable of affecting the safety, fails.

In operation 490, the update providing apparatus may update the target controller by using the update ROM image, when the target controller is the second controller. The update providing apparatus may terminate the update, even though the update of the second controller, which does not nearly affect the safety, fails.

Figure 5:
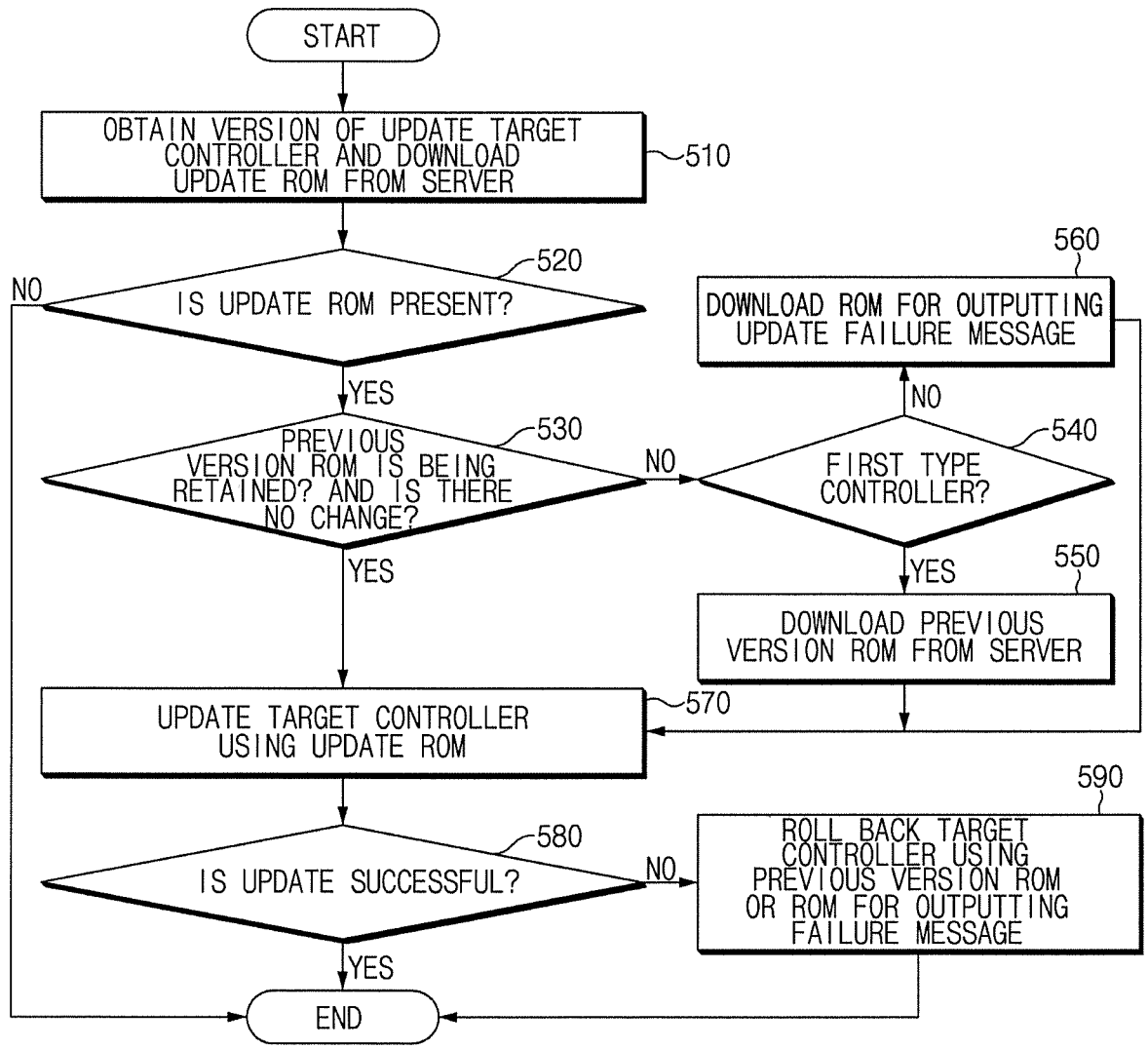
FIG. 5 is a flowchart for describing an update providing method of a vehicle, according to various embodiments of the present disclosure.

FIG. 5 is a flowchart for describing an update providing method of a vehicle, according to various embodiments of the present disclosure.

Hereinafter, it is assumed that the update providing apparatus 100 of FIG. 1 performs the process of FIG. 5. In addition, in a description of FIG. 5, it may be understood that an operation described as being performed by an apparatus is controlled by the control circuit 160 or a sub-controller of the update providing apparatus 100. For convenience of description, a detailed description about operations described with reference to FIG. 4 will not be repeated here.

Referring to FIG. 5, in operation 510, an update providing apparatus may obtain the version of an update target controller and may download an update ROM image from a server.

In operation 520, the update providing apparatus may determine whether the update ROM image of the latest version is present. The update providing apparatus may terminate the update, when the update ROM image of the latest version is absent.

In operation 530, the update providing apparatus may determine whether there is the previous version ROM image and whether there is no change of the previous version ROM image, when the update ROM image of the latest version is present.

In operation 540, the update providing apparatus may determine whether the target controller is the first controller, when the previous version ROM image is absent or when the previous version ROM image is changed.

In operation 550, the update providing apparatus may download the previous version ROM image from the server, when the target controller is the first controller.

In operation 560, the update providing apparatus may download the ROM image for outputting an update failure message, when the target controller is a second controller. For the purpose of notifying a driver that the update fails even though the roll-back is not performed when the update of the second controller fails, the update providing apparatus may download the ROM image for outputting the failure message.

In operation 570, the update providing apparatus may update the target controller by using the update ROM image.

In operation 580, the update providing apparatus may determine whether the update is successful. The update providing apparatus may terminate the update, when the update is successful.

In operation 590, the update providing apparatus may roll back the target controller by using the previous version ROM image or the ROM image for outputting the failure message, when the update fails. The update providing apparatus may restore the target controller by using the previous version ROM image, when the target controller is the first controller; the update providing apparatus may output the failure message by using the ROM image for outputting the failure message, when the target controller is the second controller.

Figure 6:
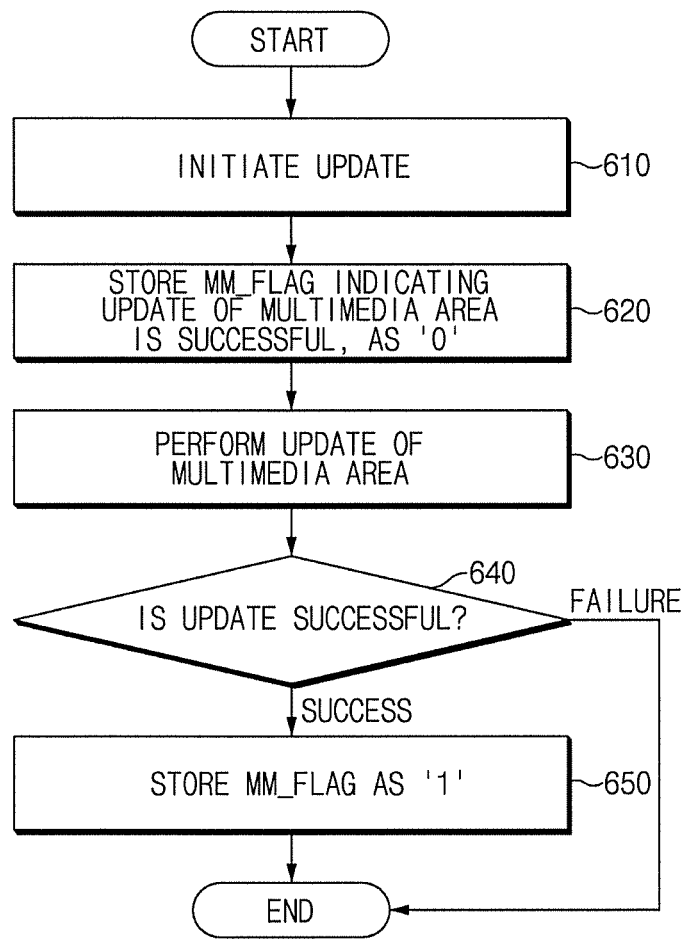
FIG. 6 is a flowchart for describing an update providing method of a vehicle, according to various embodiments of the present disclosure.

FIG. 6 is a flowchart for describing an update providing method of a vehicle, according to various embodiments of the present disclosure.

Hereinafter, it is assumed that the update providing apparatus 100 of FIG. 1 performs the process of FIG. 6. In addition, in a description of FIG. 6, it may be understood that an operation described as being performed by an apparatus is controlled by the control circuit 160 or a sub-controller of the update providing apparatus 100.

Referring to FIG. 6, in operation 610, an update providing apparatus may initiate the update of a controller.

In operation 620, the update providing apparatus may store mm_flag indicating that the update of a multimedia area is successful, as '0'. The update providing apparatus may set a flag indicating that the update of a second controller is successful. Flag '0' may indicate that the update fails; flag '1' may indicate that the update is successful.

In operation 630, the update providing apparatus may perform the update of the multimedia area. The update providing apparatus may perform the update of the second controller by using an update ROM image.

In operation 640, the update providing apparatus may determine whether the update is successful.

In operation 650, the update providing apparatus may store mm_flag as '1'. The update providing apparatus may change a flag to '1' such that the flag indicates that the update is successful.

The update providing apparatus may maintain mm_flag as '0', when the update fails.

Figure 7:
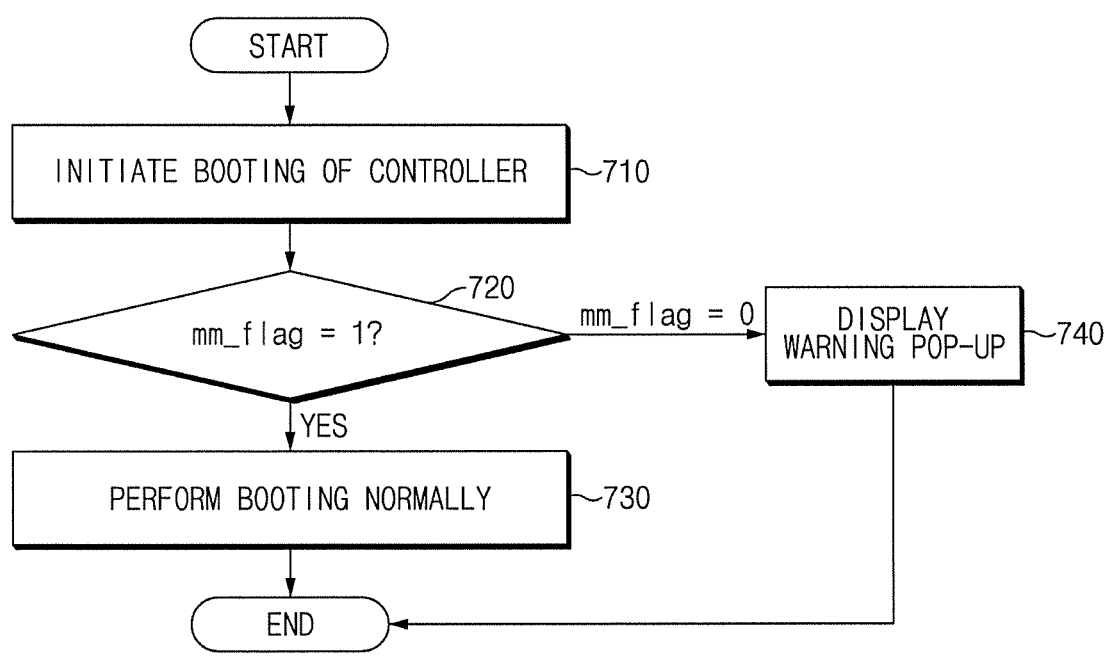
FIG. 7 is a flowchart for describing an update providing method of a vehicle, according to various embodiments of the present disclosure.

FIG. 7 is a flowchart for describing an update providing method of a vehicle, according to various embodiments of the present disclosure.

Hereinafter, it is assumed that the update providing apparatus 100 of FIG. 1 performs the process of FIG. 7. In addition, in a description of FIG. 7, it may be understood that an operation described as being performed by an apparatus is controlled by the control circuit 160 or a sub-controller of the update providing apparatus 100.

Referring to FIG. 7, in operation 710, an update providing apparatus may initiate the booting of a controller (a second controller). After the update is performed, the update providing apparatus may boot up the controller.

In operation 720, the update providing apparatus may determine whether mm_flag is '1'. The update providing apparatus may verify mm_flag, and thus may determine whether the update of the second controller is successful.

In operation 730, the update providing apparatus may perform the booting normally, when mm_flag is '1' (when the update of the second controller is successful). Since the update of the controller is successful, the update providing apparatus may perform the booting normally.

In operation 740, the update providing apparatus may display a warning pop-up window, when mm_flag is '0' (when the update of the second controller fails). The update providing apparatus may output a warning pop-up window for notifying a driver that the update fails, without performing the booting when the update fails.

Figure 8:
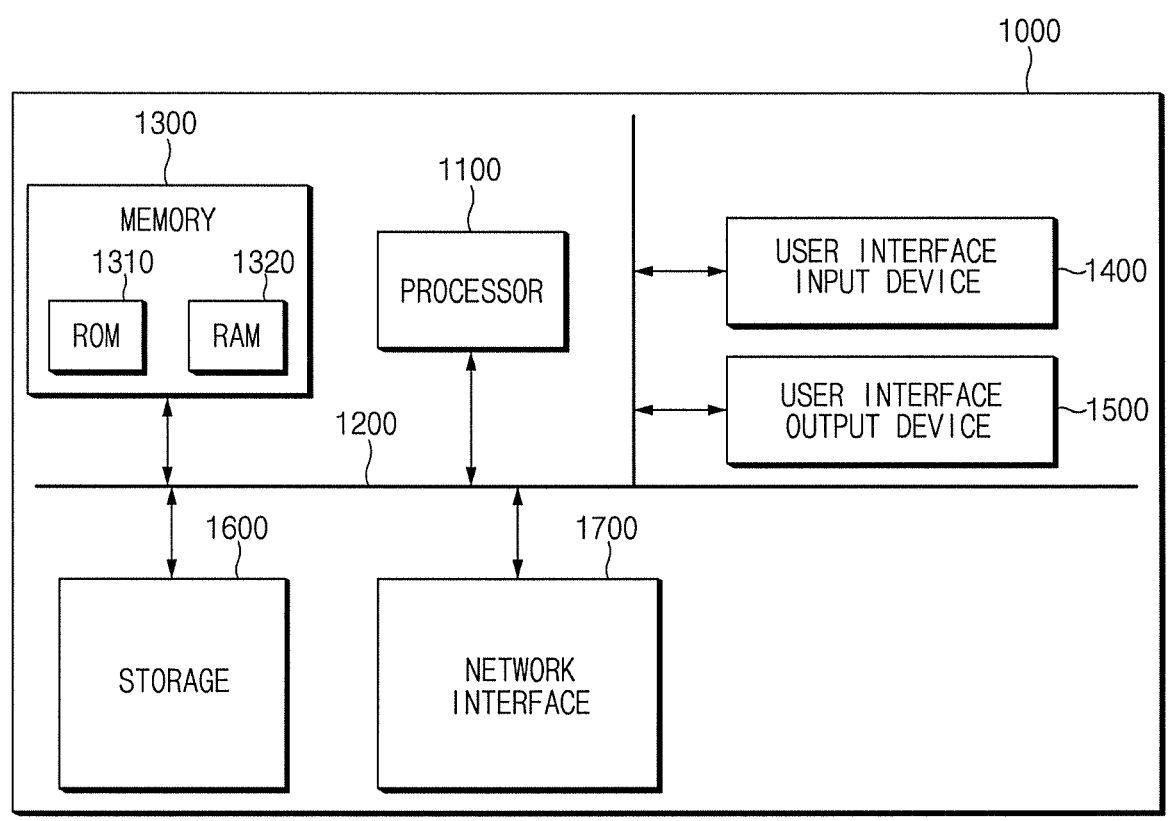
FIG. 8 illustrates a computing system according to an embodiment of the present disclosure.

FIG. 8 illustrates a computing system according to an embodiment of the present disclosure.

Referring to FIG. 8, an apparatus according to an embodiment of the present disclosure may be implemented through a computing system. A computing system 1000 may include at least one processor 1100, a memory 1300, a user interface input device 1400, a user interface output device 1500, storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the embodiments disclosed in the specification may be directly implemented with a hardware module, a software module, or a combination of the hardware module and the software module, which is executed by the processor 1100. The software module may reside on a non-transitory storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may reside in a user terminal. Alternatively, the processor and storage medium may reside as a separate component in the user terminal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

According to an embodiment of the present disclosure, an update providing apparatus of a vehicle and a computer-readable storage medium may store update data in a memory to roll back the update data only when updating a controller controlling the behavior of a vehicle, thereby reducing the manufacturing cost for the memory mounted in the vehicle.

Besides, a variety of effects directly or indirectly understood through this disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An update providing apparatus of a vehicle, the apparatus comprising:
   a communication circuit configured to communicate with a server;
   a memory;
   a first controller;
   a second controller; and
   a control circuit electrically connected to the communication circuit, the memory, the first controller, and the second controller,
   wherein the control circuit is configured to:
     receive data for an update of the first controller or the second controller, from the server using the communication circuit;
     store the data for the update in the memory and transmit the data for the update to the first controller, when the data for the update is associated with the first controller;
     roll back data of the first controller to a previous version using a previous version of data stored in the memory, when the update of the first controller fails;
     transmit the data for the update to the second controller without storing the data for the update in the memory, when the data for the update is associated with the second controller; and
     terminate the update of the second controller without a roll-back when the update of the second controller fails, to minimize a capacity of the memory mounted in the vehicle,
   wherein the first controller is configured to control a behavior of the vehicle,
   wherein the second controller includes a controller other than the first controller, among controllers included in the vehicle, and
   wherein the control circuit is further configured to:
     determine whether a previous version of data of a target controller for the update is stored in the memory before the update;
     download a previous version of data of the first controller from the server in case the update fails, when the previous version of data of the first controller is not stored in the memory; and
     download data for outputting a notification that the update fails, from the server, when a previous version of data of the second controller is not stored in the memory.

2. The apparatus of claim 1, further comprising:
   an output device,
   wherein the control circuit is configured to:
     output a notification of the failure using the output device, when the update of the second controller fails.

3. The apparatus of claim 1, wherein the control circuit is configured to:
   determine whether the received data for the update is associated with the first controller or with the second controller.

4. The apparatus of claim 1, wherein the control circuit is configured to:
   determine whether the received data for the update is associated with the first controller or with the second controller, depending on determination by the server.

5. The apparatus of claim 1, wherein the control circuit is configured to:
   obtain version information of data of a target controller of the update; and
   download the data for the update from the server, when there is a need for the update.

6. The apparatus of claim 1, wherein the control circuit is configured to:
   determine whether a previous version of data of the first controller is stored in the memory, when updating the first controller; and
   download the previous version of data from the server, when the previous version of data is not stored in the memory.

7. The apparatus of claim 1, wherein the control circuit is configured to:
   after storing the data for the update in the memory, transmit the stored data for the update to the first controller, when the data for the update is associated with the first controller.

8. A non-transitory computer-readable storage medium storing instructions executed by at least one processor included in an apparatus of a vehicle, the apparatus further including a memory, a first controller and a second controller,
   wherein the instructions, when executed by the at least one processor, comprise:
     receiving data for an update of the first controller or the second controller from a server;
     storing the data for the update in the memory and transmit the data for the update to the first controller, when the data for the update is associated with the first controller;
     rolling back data of the first controller to a previous version using a pre-stored previous version of data in the memory, when the update of the first controller fails;
     transmitting the data for the update to the second controller without storing the data for the update, when the data for the update is associated with the second controller; and
     terminating the update of the second controller without a roll-back and outputting a notification of the failure, when the update of the second controller fails, to minimize a capacity of the memory mounted in the vehicle, wherein the first controller is configured to control a behavior of the vehicle, the second controller includes a controller other than the first controller, among controllers included in the vehicle, and wherein the instructions further comprise:
 determining whether a previous version of data of a target controller for the update is stored in the memory, before the update,
 downloading a previous version of data of the first controller from the server in case the update fails when the previous version of data of the first controller is not stored in the memory; and
 downloading data for outputting a notification that the update fails from the server, when a previous version of data of the second controller is not stored in the memory.

9. An update providing apparatus of a vehicle, the apparatus comprising:
 a communication circuit configured to communicate with a server;
 a memory;
 a plurality of controllers; and
 a control circuit electrically connected to the communication circuit, the memory, and the plurality of controllers,
 wherein the control circuit is configured to:
  receive data for updates of the plurality of controllers from the server using the communication circuit,
  determine whether to perform storing the data for the updates in the memory and transmitting the data for the updates to the controllers or to perform transmitting the data for the updates to the controllers without storing the data for the updates in the memory, based on types of the controllers, and
  determine whether to perform rolling back data of the controllers to a previous version using a previous version of data pre-stored in the memory when the updates of the controllers fail or to perform terminating the updates of the controllers without a roll-back when the updates of the controllers fail, based on the types of the controllers,
 wherein the control circuit is further configured to:
  store the data for the update of the first controller among the controllers in the memory and transmit the data for the update to the first controller, when the data from the update is associated with the first controller that controls a behavior of the vehicle,
  transmit the data for the update of a second controller among the controllers to the second controller without storing the data for the update in the memory, when the data for the update is associated with the second controller that is different from the first controller and is not related to controlling the behavior of the vehicle,
  roll back data of the first controller to a previous version using a previous version of data pre-stored in the memory when the update of the first controller fails, and
  terminate the update of the second controller without a roll-back when the update of the second controller fails, and
 wherein the control circuit is further configured to:
  determine whether a previous version of data of a target controller for the update is stored in the memory, before the update;
  download a previous version of data of the first controller from the server in case the update fails, when the previous version of data of the first controller is not stored in the memory; and
  download data for outputting a notification that the update fails, from the server, when a previous version of data of the second controller is not stored in the memory.

* * * * *